United States Patent [19]
Dechavanne

[11] 3,920,252
[45] Nov. 18, 1975

[54] DYNAMIC SEAL FOR DOUBLE-ACTING PISTON

[76] Inventor: Jacques Dechavanne, 35 rue de Franceville, 93220 Gagny, France

[22] Filed: May 21, 1974

[21] Appl. No.: 471,909

[30] Foreign Application Priority Data
May 21, 1973   France .............................. 73.18448

[52] U.S. Cl. ................. 277/188; 277/165; 277/166
[51] Int. Cl. ............................................. F16j 15/24
[58] Field of Search .................... 277/121, 181–185, 277/188, 165, 235 R, 227, 231, 232, 166

[56] References Cited
UNITED STATES PATENTS

| | | | |
|---|---|---|---|
| 2,968,516 | 1/1961 | Jarvis ................................ | 277/235 |
| 3,188,099 | 6/1965 | Johnson et al. ..................... | 277/188 |
| 3,473,814 | 10/1969 | Bastow ............................... | 277/188 |
| 3,636,824 | 1/1972 | Clark ................................. | 277/165 |

*Primary Examiner*—Robert I. Smith
*Attorney, Agent, or Firm*—Karl F. Ross; Herbert Dubno

[57] ABSTRACT

A dynamic seal for a double-acting piston slidable in a cylinder and separating a pair of chambers under pressure comprises a pair of like cup packings arranged parallel to each other and having lips directed toward each other, and a core ring between and bonded to the cup packings. The packings are constituted of a fabric-reinforced elastomer and the core ring is unreinforced and has a smaller modulus of elasticity than the cup packings. A Teflon washer may be received in a groove formed in the core ring between the cup packings, and antiextrusion elements overlying the outer ends of the cup packings may be provided to prevent damage to these cup packings. Pressure exerted on one of the cup packings is transmitted through the core ring to the other cup packing to press it tightly into engagement with the inner wall of the cylinder.

6 Claims, 7 Drawing Figures

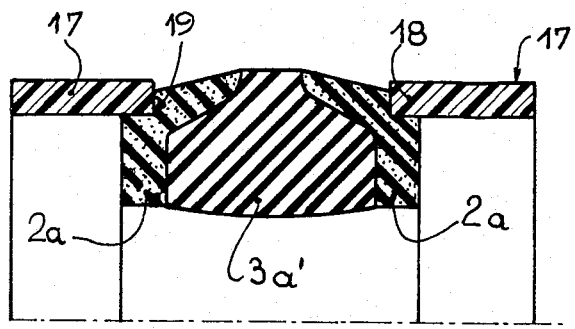
FIG.4
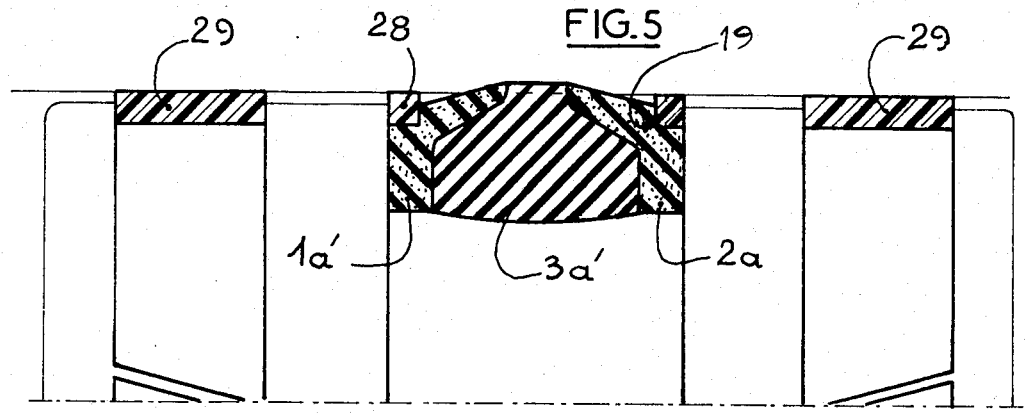
FIG.5
FIG.6
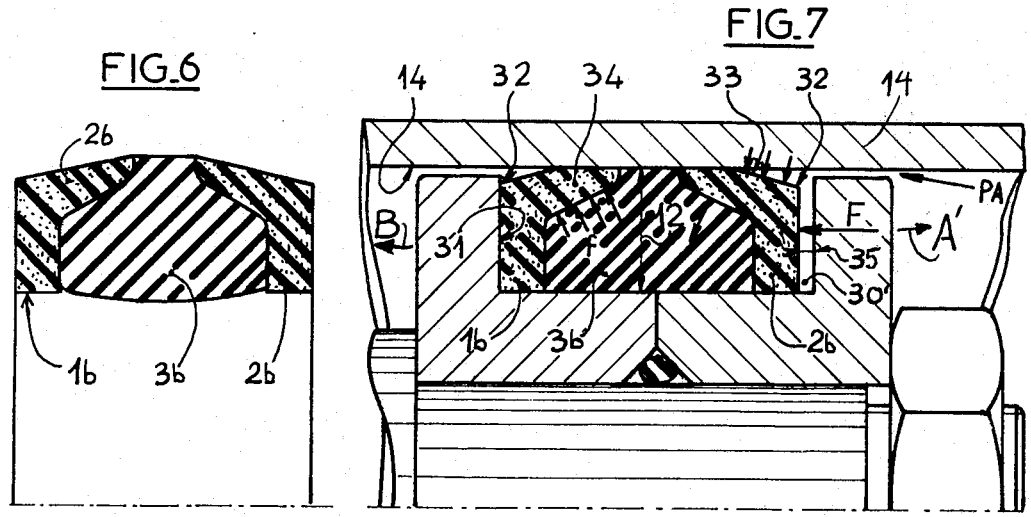
FIG.7

DYNAMIC SEAL FOR DOUBLE-ACTING PISTON

Field of the Invention

The present invention relates to a seal. More particularly this invention concerns a dynamic seal for a piston reciprocatable in a cylinder and defining therein a pair of separate pressurized chambers.

Background of the Invention

A piston seal is usually formed of one or more annular and elastic resilient elements of toroidal shape which are mounted by pairs in circumferential grooves formed in the piston. The two seals either face toward each other or in opposite directions. It is also known to provide a flat ring between two such elements, also known as glands, so as to hold them in place, these flat rings constituting so-called antiextrusion elements.

Another type of seal is known where a central elastic core compresses at least one ring element against the internal surface of the cylinder in which the piston being sealed reciprocates. Many combinations are known using rings of various sections. In most of these arrangements the rings are pressed at all times against the cylinder walls, this pressure being sufficient to maintain a tight seal up to a predetermined pressure limit which is above the operating pressure for the piston in question.

In the arrangement using a pair of like cups mounted in a common slot and facing each other, with a flat spacer between them, a common problem is than an air pocket is developed between these two so-called glands. When the piston is used to pump oil this air becomes mixed with the oil, a circumstance which frequently is very undesirable. Such an arrangement also creates a so-called dieseling effect due to the introduction of an air-fuel mixture in the space between the two facing glands. When this space is filled with a hard elastomeric element pressing the gland outward against the inner surface of the cylinder motion of the piston is resisted by the gland so that considerable losses due to friction are encountered.

Objects of the Invention

It is therefore an object of the present invention to provide an improved piston seal.

Another object is the provision of an improved seal which overcomes the above disadvantages, which in particular provides a very tight seal which at the same time has minimal friction in contact with the inside of the cylinder wall.

Summary of the Invention

These objects are attained according to the present invention in a ring seal comprising a pair of fabric-reinforced cup packings having lips directed towards each other and with an annular central spacer ring having a modulus of elasticity substantially lower than that of the lip packings, the two lip packings and the central ring all being integrally bonded together. This type of seal, a so-called monoblock, is received in a circumferential groove in a piston, shaft, or other element adapted to reciprocate within a cylinder.

The seal according to the present invention has all of the advantages of the conventional automatic or pressure-actuated packings wherein fluid pressure automatically supplies the force required by the packing to effect a seal, and at the same time eliminates most of the disadvantages of such packing. The packing in accordance with the present invention is solid so that it is impossible for an air pocket to develop between the two lip packings. At the same time the relatively soft central member allows force transmission in a completely novel fluid-like manner from the one lip packing to the other so that force is transmitted from the leading packing through the central ring to the trailing packing in a manner impossible in prior-art seals where the space between the two packings is empty or provided with a nonelastic pedestal ring or the like holding the cup packings in place.

According to yet another feature of this invention the central ring is formed between the lips with a circumferential rectangular-section groove in which is received a seal ring having a lower coefficient of friction than either of the packings or the central ring. A synthetic resin such as polyfluorethylene (Teflon) is ideal for such a use. In such an arrangement the frictional force between the seal and the inner wall of the cylinder, in which the piston reciprocates and in which the piston may even rotate, is proportional to the fluid pressure differential across the seal.

According to yet another feature of this invention the lip packing is formed on its outer side, that is its side turned away from the other lip packing, at its radially outer edge with a notch in which is received one arm of a T-section holding ring which serves to hold the seal tightly in place and prevent extrusion thereof.

In accordance with further features of this invention the seal or the entire seal and holding member assembly is received in a groove in the piston or shaft which has an axial length somewhat longer than the seal or assembly length so that this seal or assembly can reciprocate always pressing against the trailing flank of the piston groove. This clearance may be as great as one-fifth of the overall axial length of the seal or seal assembly.

Description of the Drawing

The above and other objects, features, and advantages will become more readily apparent from the following description, reference being made to the accompanying drawing in which:

FIGS. 3, 4, 5, and 6 are further sections similar to FIG. 1 illustrating other arrangements in accordance with this invention; and FIG. 7 is an axial section through a piston and cylinder assembly using the seal of FIG. 6.

Specific Description

Figure 1:
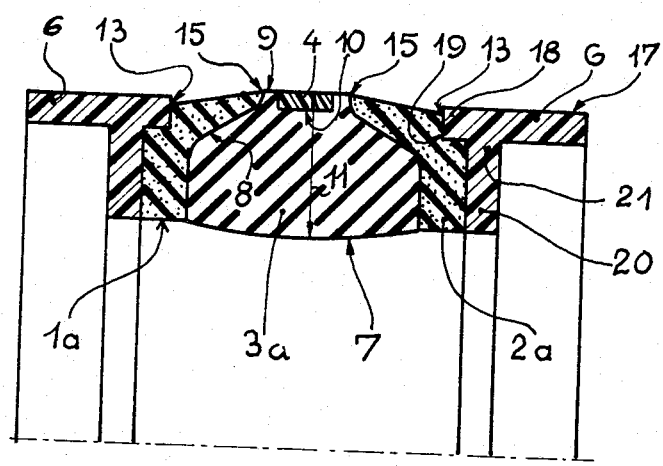
FIG. 1 is an axial section through a seal in accordance with this invention.
Figure 2:
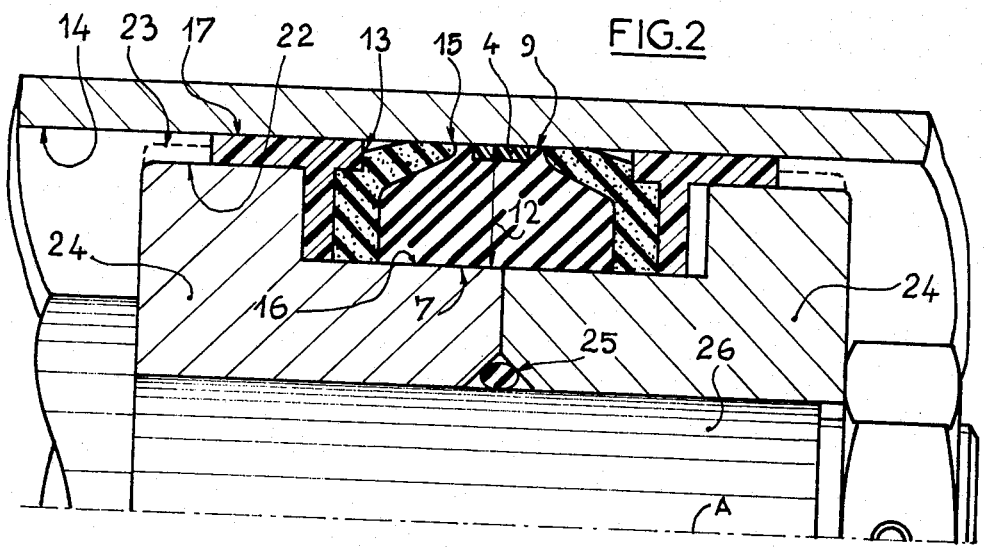
FIG. 2 is an axial section through a piston and cylinder assembly having the seal of FIG. 1.

As shown in FIGS. 1 and 2 a low-pressure seal $1a$ according to the present invention comprises a pair of identical cup or single-lip packings $2a$ between whose inner faces 8 is bonded an elastomeric ring $3a$. The cups $2a$ are made of an elastomer having a high modulus of elasticity and reinforced with fabric whereas the ring $3a$ has a low modulus of elasticity and is not reinforced. All these elements are made of synthetic rubber. The central ring $3a$ is formed with a circumferential groove 10 a rectangular section in which is received a flat ring 4 having a very low coefficient of friction, here the ring being made of polytetrafluorethylene. Thus only a narrow band 9 of the soft core $3a$ is exposed on the outside, whereas the inside surface 7 of this core member 3a is normally inwardly convex. Thus the radial height 11 of the seal 1a when relaxed is greater than the gap 12 (FIG. 2) in which it is to fit so that the seal 1a will be somewhat compressed against the inner wall of a cylinder 14. The single-lip rings 2a as shown, are of generally L-section so that their lips or flanges overhang the elastomeric ring 3a. Since only one lip is provided the base of the ring 3a can, over the maximum axial width of the ring, press against the floor of the piston groove in which it is seated.

Each of the lip packings 2a is formed on its end with an axially and radially open square-section (right-angle profile) groove 19 in which is formfittingly received one arm 18 of a T-section antiextrusion ring 17 whose central leg 20 lies against the axial end of the seal 1a and whose other arm 6 is adapted to lie against a piston formed by a pair of identical piston sections 24 which are bolted together on a piston rod 26 on either side of an 0 ring 25 and which are reciprocal along an axis A. This piston is formed with a groove 16 of square section and defines a clearance with the cylinder 14 equal to slightly more than the width of the arms 6 and 13 of the T-section antiextrusion ring 17. The distance between the base of the groove 19 and the inner wall of the cylinder 14 is equal to 12, as mentioned above.

The piston section 24 may be built up as shown at 23 to form a shoulder in back of each of the antiextrusion rings 17. These rings 17 are dimensioned so that their regions 21 are sufficiently strong to accept the axial force applied to the seal 1a during use. In use the inner half 15 of the outer edge of the packing 2a lies against the inner wall of the cylinder 14 whereas the outer or end edges 15 are out of contact with the cylinder wall 14. The halves 19 of the packings 2a are held down and out of contact by means of the shoulder or arm 18 of the T-section antiextrusion ring 17 which is advantageously made of a polyacetate, bronze, or other material having a low coefficient of friction.

Figure 3:
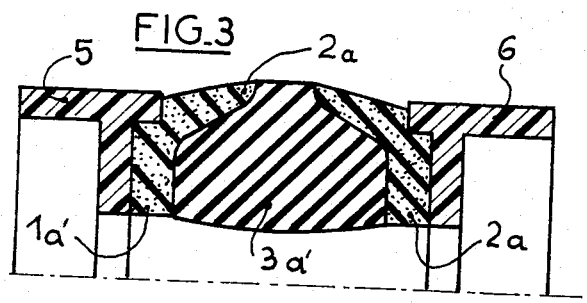

FIG. 3 shows how the seal 1a' can be made with a core element 3a' which again is integrally bonded or vulcanized to the outer elements 2a but which is not formed with a groove 10. Such a seal is less expensive to manufacture than the seal of FIGS. 1 and 2 and is useful when high pressures are to be employed.

FIG. 4 shows how the central leg 20 of the antiextrusion rings 17 can be dispensed with in an arrangement where a minimal axial length must be obtained. Thus such an arrangement simply comprises a pair of flat cylindrical rings 17 whose ends 18 are engaged in the notches 19 formed in the lip packings 2a.

In FIG. 5 there is shown an arrangement wherein a simple square-section polyacetal ring 28 is fitted into each of the notches 19 to prevent extrusion and separate split-ring guides 29 are provided of cylindrical shape which serve to secure the seal 1a' in the respective piston. Such an arrangement is indicated where the piston to be sealed is subject to considerable tangential forces or is arrested and reversed rapidly.

FIG. 5 shows a seal 1b identical to that of FIG. 3 except that here the two lip packings 2b flanking the central core 3b are notched at their outer edges 18. The seal functions in the following manner:

When moved in the direction of arrow A' the entire seal 1b is displaced against a trailing flank 31 of the groove and the piston, leaving a gap 30 having a dimension equal to approximately 1-1/10 of the overall axial length of the seal at the leading end of the groove and the piston. Pressure PA goes over the end of the piston and presses as a force F against the outer region 32 of the leading lip packing 2b as shown by arrows 33. This compresses the respective side of the core 3b down, forcing the opposite side up as shown by arrows f so as to press the central region 34 of the trailing packing 2b against the interior of the cylinder 14. The region 32 corresponding to the trailing end of the seal 1b lies completely out of contact with the cylinder 14. When the piston is moved in the opposite direction, that is direction B, the operation is reversed with the oil to the side of the piston serving as lubrication of the seal and as coolant for the cylinder 14.

I claim:
1. A seal for a piston slidable in a cylinder and separating a pair of chambers under pressure, said seal comprising:
   a pair of like single-lip cup packings of generally L-section arranged parallel to each other and having their single lips directed toward each other, said packings being constituted of a fabric-reinforced elastomer; and
   a core ring axially aligned between and bonded to said packings, said ring being unreinforced and having a smaller modulus of elasticity than said cup packings, said core ring having a base of its maximum axial thickness adapted to press against the piston.

2. The seal defined in claim 1 wherein said core ring is formed with an outwardly open groove, said seal further comprising an anti-friction ring received in said groove and having a smaller coefficient of friction than said core ring and said cup packings.

3. The seal defined in claim 1, further comprising a rigid antiextrusion ring at each axial end of said seal and at least partially radially surrounding said seal, said cup packings being formed at their ends with axially and radially outward open grooves of right-angle profile, said antiextrusion rings being at least partially received formfittingly in said grooves.

4. The seal defined in claim 3 wherein said antiextrusion rings are cylindrically annular.

5. The seal defined in claim 3 wherein said antiextrusion rings are of T-section and each has a leg lying against an outer face of a respective cup packing, an arm received in a respective groove, and another arm extending away from the firstmentioned arm and lying parallel to the inner wall of said cylinder.

6. The seal defined in claim 3, further comprising a second such rigid ring mounted on said piston spaced from each of the first-mentioned antiextrusion rings.

* * * * *